US 7,783,590 B2

(12) United States Patent
Fukazawa et al.

(10) Patent No.: US 7,783,590 B2
(45) Date of Patent: Aug. 24, 2010

(54) TASK SELECTION APPARATUS AND TASK SELECTION ASSISTANCE METHOD

(75) Inventors: Yusuke Fukazawa, Yokosuka (JP); Takefumi Naganuma, Yokosuka (JP); Shoji Kurakake, Yokohama (JP)

(73) Assignee: NTT DoCoMo, Inc., Chiyoda-ku (JP)

( * ) Notice: Subject to any disclaimer, the term of this patent is extended or adjusted under 35 U.S.C. 154(b) by 1066 days.

(21) Appl. No.: 11/393,827

(22) Filed: Mar. 31, 2006

(65) Prior Publication Data
US 2006/0223509 A1   Oct. 5, 2006

(30) Foreign Application Priority Data
Mar. 31, 2005   (JP)   ............................. 2005-103085

(51) Int. Cl.
  *G06F 7/00*   (2006.01)
(52) U.S. Cl. ...................... 707/3; 707/2; 707/4; 707/5; 707/6; 455/414.3; 705/9; 718/1; 718/102; 718/106; 718/107; 718/108; 704/9; 704/10; 704/270; 704/275; 709/203
(58) Field of Classification Search .............. 704/9, 704/10, 270, 275; 707/2–6; 705/9; 455/414.3; 709/203; 718/1, 100–108
See application file for complete search history.

(56) References Cited

U.S. PATENT DOCUMENTS

| | | | | |
|---|---|---|---|---|
| 6,029,195 | A | * | 2/2000 | Herz ........................... 725/116 |
| 6,154,745 | A | * | 11/2000 | Kari et al. .................... 707/100 |
| 7,103,559 | B2 | * | 9/2006 | Worthington .................. 705/8 |
| 7,137,099 | B2 | * | 11/2006 | Knight et al. ................ 717/100 |
| 7,188,100 | B2 | * | 3/2007 | De Bellis et al. ............... 707/3 |
| 7,421,645 | B2 | * | 9/2008 | Reynar ........................ 715/206 |
| 7,428,535 | B1 | * | 9/2008 | Peyton et al. .................. 707/5 |
| 7,450,966 | B2 | * | 11/2008 | Vanska et al. ................ 455/558 |

(Continued)

FOREIGN PATENT DOCUMENTS

EP          0 853 287 A2      7/1998

(Continued)

OTHER PUBLICATIONS

Yusuke Fukazawa et al., "A Framework for Task Retrieval in Task-Oriented Service Navigation System", OTM Workshops 2005, LNCS 3762, pp. 876-885, Nov. 2005.

(Continued)

*Primary Examiner*—David R Hudspeth
*Assistant Examiner*—Lamont M Spooner
(74) *Attorney, Agent, or Firm*—Crowell & Moring LLP

(57) ABSTRACT

The present invention provides a task selection assistance apparatus, and a task selection assistance method, which enable burdens on a user to be alleviated in selecting a task for solving a problem. A domain candidate determining portion 210 determines domain candidates to be presented to the user from among domains stored in a task model DB 102, and a domain candidate transmitting portion 201 transmits the domain candidates to a portable terminal 101. A user selected domain obtaining portion 203 obtains a domain, which has been selected by the user, from the portable terminal 101, and the task candidate determining portion 211 determines task candidates to be presented to the user from among tasks stored in the task model DB 102 based on the domain selected by the user.

11 Claims, 8 Drawing Sheets

U.S. PATENT DOCUMENTS

| | | | | |
|---|---|---|---|---|
| 7,472,172 | B2 * | 12/2008 | Anderson et al. | 709/219 |
| 7,475,057 | B1 * | 1/2009 | Obradovich | 707/3 |
| 7,522,992 | B2 * | 4/2009 | Obradovich et al. | 701/200 |
| 2005/0222918 | A1 | 10/2005 | Vanska et al. | |

FOREIGN PATENT DOCUMENTS

| | | | |
|---|---|---|---|
| EP | 1427226 A1 * | 6/2004 | |
| JP | 8-115361 A | 5/1996 | |
| WO | WO 01/35678 A2 | 5/2001 | |
| WO | WO 2004/040923 A1 | 5/2004 | |

OTHER PUBLICATIONS

Yusuke Fukazawa et al., "A Study of Task-model based Service Knowledge Searching Methodology", vol. 105, No. 80, ISSN 0913-5685, pp. 63-68, May 2005.

Yusuke Fukazawa et al., "A study of predicting user's task based on task-model towards realizing advanced service navigation system", vol. 2006 No. 2, ISSN 0919-6072, pp. 35-42, Jan. 2006.

European Search Report (in English) dated Apr. 24, 2006 (Six (6) Pages).

Japanese Office Action w/Translation.

Tadashi Okamine, "Interpretation of user context for assisting task selection in service navigation system", IPSJ SIG Technical Report, Information Processing Society of Japan, Mar. 18, 2005, vol. 2005 No. 28, pp. 209-215 (Partial Translation).

* cited by examiner

FIG. 2

| TASK ID | PARENT TASK ID | TASK | DOMAIN | TASK PHASE - EXECUTING PHASE | TASK PHASE - PLANNING PHASE | WEATHER SENSOR |
|---|---|---|---|---|---|---|
| 1000 | 0 | GO TO A MOVIE | MOVIE THEATER | O | O | |
| 1001 | 1000 | SEARCH FOR TITLES NOW ON SCREEN | MOVIE THEATER | O | O | |
| 1002 | 1000 | SEARCH FOR A MOVIE THEATER | MOVIE THEATER | | O | |
| 1003 | 1000 | HAVE A MEAL DURING A WAITING TIME | MOVIE THEATER V THEME PARK V IN TOWN V ··· | O | | |
| 1005 | 1000 | BUY A BOOKLET | MOVIE THEATER | O | | |
| 1006 | 1000 | RESERVE SEATS IN A MOVIE THEATER | MOVIE THEATER | | O | |
| | 1000 | SEARCH FOR A ROUTE TO A MOVIE THEATER | MOVIE THEATER | | O | |
| | | ... | | | | |
| 2000 | 0 | ENJOY IN A THEME PARK | THEME PARK | O | O | |
| 2001 | 2000 | WATCH A PARADE | THEME PARK | O | O | IT IS RAINING |
| 2002 | 2001 | SEARCH FOR PARADE HOURS | THEME PARK | O | O | IT IS RAINING |
| 2003 | 2000 | HAVE A MEAL DURING A WAITING TIME | MOVIE THEATER V THEME PARK V IN TOWN V ··· | O | | |
| 2004 | 2000 | SEARCH FOR A ROUTE TO A THEME PARK | THEME PARK | | O | |
| | | ... | | | | |
| 3000 | 1000V2000V··· | HAVE A MEAL DURING A WAITING TIME | MOVIE THEATER V THEME PARK V IN TOWN V ··· | | O | |
| 3002 | 3000 | HAVE A SNACK IN A COFFEE SHOP | MOVIE THEATER V THEME PARK V IN TOWN V ··· | | O | |
| 3003 | 3000 | HAVE A MEAL IN A FAST FOOD RESTAURANT | MOVIE THEATER V THEME PARK V IN TOWN V ··· | | O | |
| 3004 | 3000 | BUY A SNACK IN A MOVIE THEATER | MOVIE THEATER | O | | |
| 3005 | 3000 | HAVE A MEAL AT A STREET STALL | THEME PARK V IN TOWN | O | | IT IS RAINING |
| | | ... | | | | |

TASK SELECTION APPARATUS AND TASK SELECTION ASSISTANCE METHOD

BACKGROUND OF THE INVENTION

1. Field of the Invention

The present invention relates to a task selection assistance apparatus, and a task selection assistance method, for assisting a user in selecting a task for solving a problem.

2. Description of the Related Art

Conventionally, various techniques have been proposed to assist a user in solving a problem.

For example, JP8-115361A (paragraph 0016, and FIG. 1) has proposed a system which provides services depending on each individual user based on the popularity of the service used by the user. However, in the system described in JP8-115361A, the user is required to input a service identifier and a user identifier to a terminal in order to be served by the system. Therefore, the user must have an advance understanding of a service for solving a problem, and the system described in JP8-115361A would be inconvenience for a user who does not have the advance understanding of the service for solving the problem.

There has been another approach for helping a user to search for desired tasks or services for solving problems by defining actions to be taken by the user to solve his or her problem as tasks. In such an approach, the user navigates through tasks in a hierarchical structure displayed on a terminal to find a task for solving a problem.

However, it is not easy for a user to search for a desired task among a large number of menu items and/or tasks through a complicated hierarchical structure displayed on a terminal. Particularly when the user uses a portable terminal to search for a task, a fair amount of time has been consumed in doing so, burdening the user, because of a small screen and poor operability of the portable terminal.

The present invention has been made in view of the foregoing problems, and it is an object of the invention to provide a task selection assistance apparatus, and a task selection assistance method, which enable burdens on a user to be alleviated in selecting a task for solving a problem.

SUMMARY OF THE INVENTION

In order to solve the foregoing problems, according to an aspect of the invention of claim 1, there is provided a task selection assistance apparatus, comprising: task model storing means for storing one or more tasks each indicating an action to be taken by a user to solve his or her problem and one or more pieces of attribute information each indicating an attribute of a task, the stored one or more tasks and the stored one or more pieces of attribute information being associated with each other; attribute candidate determining means for determining one or more attribute information candidates to be presented to the user from among the one or more pieces of attribute information stored in the task model storing means; user selected attribute obtaining means for obtaining one or more pieces of attribute information selected by the user from the one or more attribute information candidates determined by the attribute candidate determining means; and task candidate determining means for determining one or more task candidates to be presented to the user from among the one or more tasks stored in the task model storing means, based on the one or more pieces of attribute information obtained by the user selected attribute obtaining means.

According to the arrangement, the task selection assistance apparatus first determines candidates for attribute information of tasks to be presented to the user, and then determines candidates for the tasks based on the attribute information selected by the user from the determined candidates for the attribute information, so that the tasks to be presented to the user can be narrowed down using attribute information, and burdens on the user can be alleviated in selecting the task.

According to an aspect of the invention of claim 2, in the task selection assistance apparatus according to claim 1, each of the one or more pieces of attribute information is subject location information indicating a location subject to the task.

According to the arrangement, the attribute information is subject location information indicating a location subject to the task. This allows the task candidates to be narrowed down depending on a location subject to the task for solving a problem, and appropriate tasks to be presented to the user. Therefore, burdens on the user may be alleviated in selecting a task.

According to an aspect of the invention of claim 3, in the task selection assistance apparatus according to claim 2, further comprising user location information obtaining means for obtaining user location information indicating a user location, the attribute candidate determining means determines one or more pieces of subject location information to be preferentially presented to the user based on the user location information obtained by the user location information obtaining means.

According to the arrangement, the task selection assistance apparatus determines subject location information to be preferentially presented to the user based on user location information, and therefore, subject location information which is likely to be desired by the user may be preferentially presented to the user depending on the user location. Therefore, burdens on the user may be alleviated in selecting a task.

According to an aspect of the invention of claim 4, in the task selection assistance apparatus according to claim 2, further comprising task phase determining means for determining a task phase desired by the user, by comparing the user location information obtained by the user location information obtaining means to the one or more subject location information obtained by the user selected attribute obtaining means, the task candidate determining means determines one or more task candidates to be preferentially presented to the user, based on the task phase determined by the task phase determining means.

According to the arrangement, the task selection assistance apparatus can determine a task phase desired by the user, and determine task candidates to be preferentially presented to the user based on the determined task phase. This allows tasks which are accomplished in a phase desired by the user, such as an executing phase and a planning phase, to be preferentially presented to the user. Therefore, burdens on the user may be alleviated in selecting a task.

According to an aspect of the invention of claim 5, in the task selection assistance apparatus according to claim 1, further comprising query obtaining means for obtaining a query inputted by the user to search for a desired task, the task candidate determining means determines the one or more task candidates to be preferentially presented to the user, based on the query obtained by the query obtaining means.

According to the arrangement, the task selection assistance apparatus can determine task candidates to be preferentially presented to the user based on a query inputted by the user. This allows tasks desired by the user to be preferentially presented to the user. Therefore, burdens on the user may be alleviated in selecting a task.

According to an aspect of the invention of claim 6, in the task selection assistance apparatus according to claim 1, further comprising sensor information obtaining means for obtaining one or more pieces of sensor information measured by one or more sensors which measure environmental conditions around the user, the task candidate determining means determines the one or more task candidates to be preferentially presented to the user, based on the one or more pieces of sensor information obtained by the sensor information obtaining means.

According to the arrangement, the task selection assistance apparatus can determine task candidates to be preferentially presented to the user based on sensor information. This allows tasks which are appropriate for environmental conditions around the user to be preferentially presented to the user. Therefore, burdens on the user may be alleviated in selecting a task.

According to an aspect of the invention of claim 7, there is provided a task selection assistance method, comprising: a subject location candidate obtaining step of obtaining one or more subject location information candidates to be presented to a user from a task model database storing one or more tasks each indicating an action to be taken by the user to solve his or her problem and one or more pieces of subject location information each indicating a location subject to a task, the stored one or more tasks and the stored one or more pieces of subject location information being associated with each other; a user location information obtaining step of obtaining user location information indicating a user location; a rearranging step of rearranging the one or more subject location information candidates obtained in the subject location candidate obtaining step so that one or more pieces of subject location information corresponding to the user location information obtained in the user location information obtaining step is located at higher level; and a subject location presenting step of presenting the one or more subject location information candidates rearranged in the rearranging step to the user.

According to the method, subject location information candidates can be rearranged so that subject location information corresponds to user location information indicating a user location is located at higher level, and therefore, subject location information which is likely to be desired by the user at the current location may be preferentially presented to the user. Therefore, burdens on the user may be alleviated in selecting a task.

According to an aspect of the invention of claim 8, in the task selection assistance method according to claim 7, the method further comprises: a user selected subject location information obtaining step of obtaining one or more pieces of subject location information selected by the user from the one or more subject location information candidates presented to the user in the subject location presenting step; and a task candidate determining step of determining one or more task candidates to be presented to the user from the task model database, based on the one or more pieces of subject location information obtained in the user selected subject location information obtaining step.

According to the method, task candidates may be narrowed down based on subject location information selected by the user to present to the user, and therefore, task candidates which are likely to be desired by the user may be presented to the user depending on the user location. Therefore, burdens on the user may be alleviated in selecting a task.

According to the present invention, the task selection assistance apparatus first determines candidates for attribute information of tasks to be presented to the user, and then determines candidates for the tasks based on the attribute information selected by the user from the determined candidates for the attribute information, so that the tasks to be presented to the user can be narrowed down using attribute information, and burdens on the user can be alleviated in selecting the task.

BRIEF DESCRIPTION OF THE DRAWINGS

FIG. 2 shows an example of a data arrangement in the task model DB according to the embodiment;

DETAILED DESCRIPTION OF THE PREFERRED EMBODIMENTS

Embodiments of the present invention will now be described with reference to the drawings.

[1. Configuration]

Figure 1:
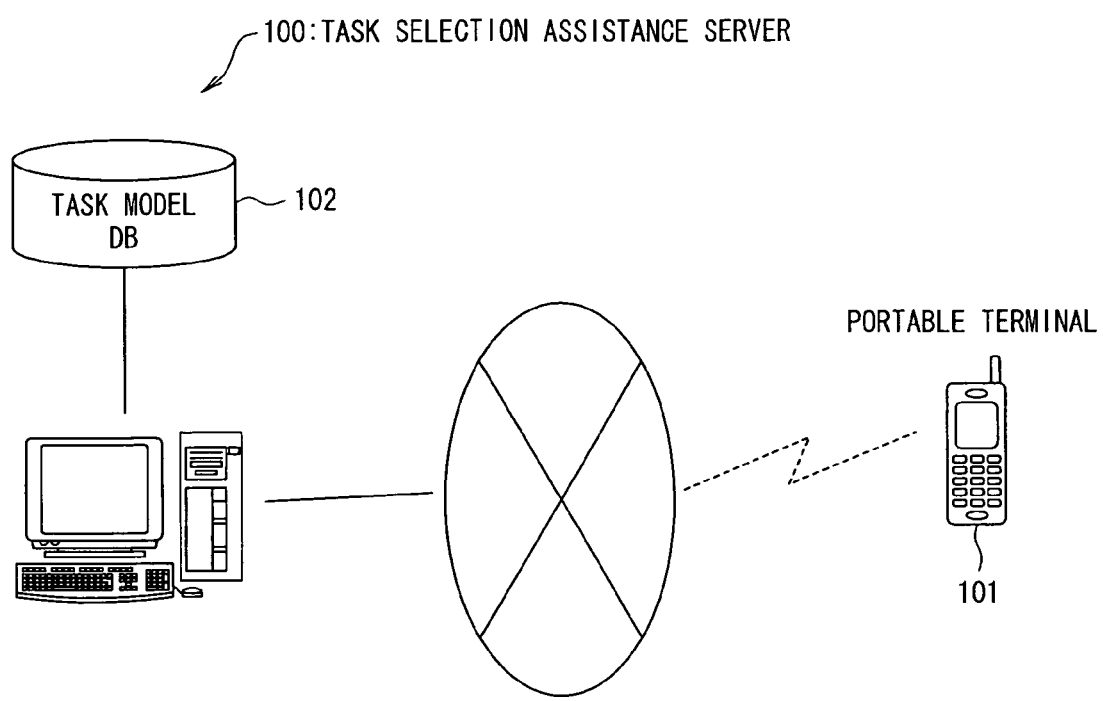
FIG. 1 shows a configuration of a task selection assistance system according to an embodiment of the present invention.

FIG. 1 shows a configuration of a task selection assistance system as a whole. As shown in FIG. 1, the task selection assistance system includes a task selection assistance server 100, which is a server for assisting a user in selecting a task for solving a problem, and a portable terminal 101 belonging to the user. The task selection assistance server 100 and the portable terminal 101 are connected together through a communication network such as a mobile communication network and the Internet or the like. The task selection assistance server 100 manages a task model database (hereinafter referred to as "task model DB") 102 which stores task models.

[1.1. Configuration of Task Selection Assistance Server]

The configuration of the task selection assistance server 100 will now be described. Hardware arrangements of the task selection assistance server 100 include a central processing unit (CPU), a read only memory (ROM), a random access memory (RAM), a hard disk device, and communication interfaces, and also have other hardware arrangements of a typical computer. The hard disk device of the task selection assistance server 100 stores various types of software such as programs and databases.

[1.1.1. Configuration of Task Model DB]

The hard disk device of the task selection assistance server 100 stores the task model DB (task model storing means) 102. The task model DB 102 is a database which stores information related to tasks. As used herein, the term "task" refers to an action to be taken by a user to solve his or her problem.

FIG. 2 shows a data arrangement in the task model DB 102. As shown in FIG. 2, data items of the task model DB 102 include "task ID," "parent task ID," "task," "domain," "task phase," and "weather sensor."

The data item "task ID" is a number identifying a task. Here, the task ID is intended to be a unique integer for each of all the tasks.

The data item "parent task ID" is a number indicating a parent-child relationship (dependency) between tasks. For example, the task "Search for titles now on screen" corresponding to the task ID "1001" has the parent task "Go to a movie" corresponding to the task ID "1000," and therefore, the task ID "1000" of "Go to a movie" is stored in the parent task ID of the task "Search for titles now on screen."

The task "Go to a movie" corresponding to the task ID "1000" is the topmost task. The parent task ID of the topmost task stores "0."

Further, it is conceivable that a task such as the task "Have a meal during a waiting time" has two or more parent tasks, including the tasks "Go to a movie" and "Enjoy in a theme park." In this case, as shown in FIG. 2, the parent task ID of the task "Have a meal during a waiting time" is represented using an OR symbol "V." In this case, there may be multiple domains, and the domains are similarly indicated using an OR symbol "V."

The data item "task" is a defined task content.

The data item "domain" is subject location information (hereinafter referred to as "domain") indicating a location subject to a task (specifically, an intended location or a location of interest). In the embodiment, the domain is used as a common noun. A domain for a task can be constructed by defining a location subject to the task. For example, consider the task "Watch a parade." The location subject to the task may be defined as a "theme park." A domain may be considered as one of attributes of a task.

The data item "task phase" is information indicating whether each task is accomplished in an executing phase or in a planning phase. A task accomplished in the executing phase (or a task in the executing phase) is a task expected to be accomplished in a domain. On the other hand, a task in the planning phase is a task expected to be accomplished in other locations than the domain. A task which is expected to be accomplished in a location independent of domains is applicable to both the executing and planning phases.

For example, the task "Reserve seats in a movie theater" is expected to be accomplished in other locations than a "movie theater," i.e. the domain of the task, and therefore, the task is in the planning phase. Similarly, the task "Buy a booklet" is expected to be accomplished in a "movie theater," i.e. the domain of the task, and therefore, the task is in the executing phase. Further, the task "Search for titles now on screen" may be accomplished in either a "movie theater," i.e. the domain of the task, or other locations than the "movie theater," i.e. the domain of the task, and therefore, the task is independent of domains of the task. In this case, the task "Search for titles now on screen" is applicable to both the task in the executing phase and the task in planning phase.

Under the data item "weather sensor," sensor information on a circumstance under which the task would not be accomplished is written. For example, the task "Watch a parade" corresponding to the task ID "2000" is not likely to be accomplished if the sensor information obtained from the weather sensor indicates "It is raining." The data item "weather sensor" is used to avoid accomplishing a task. Other than the data item "weather sensor," data items on sensors which measure environmental conditions around the user may be provided in the task model DB 102. For example, data items for a humidity sensor and a noise sensor may be provided.

[1.1.2. Functional Configuration]

Figure 3:
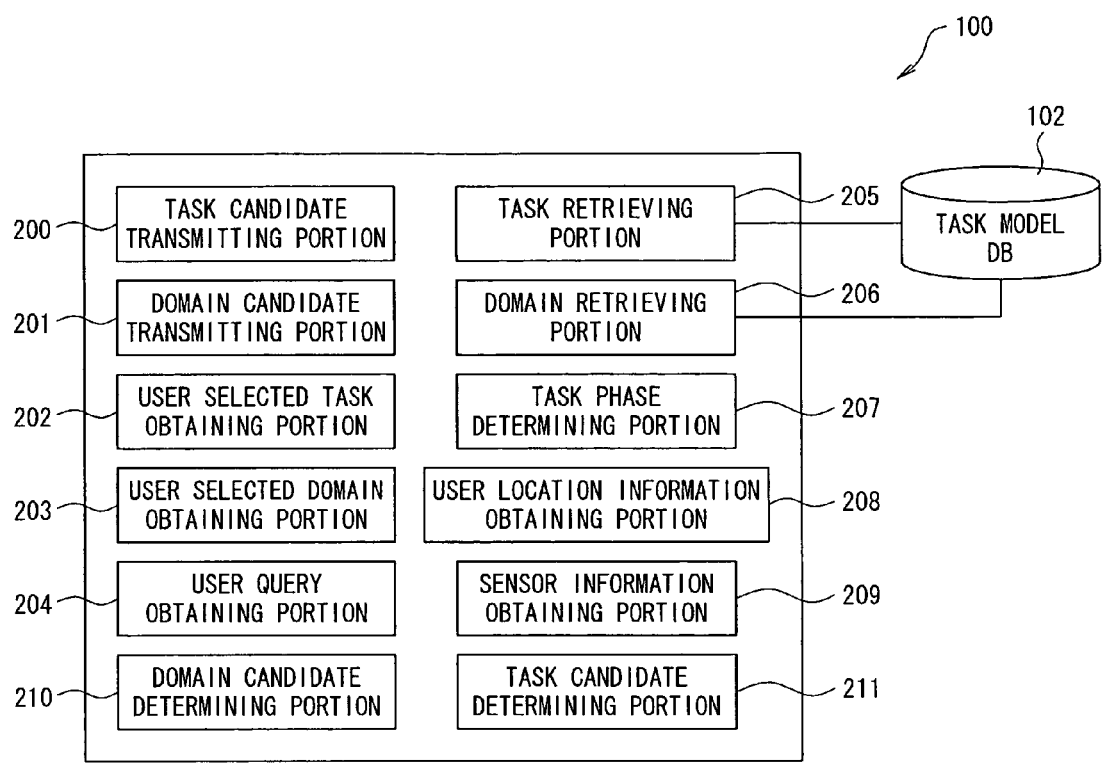
FIG. 3 is a block diagram of a task selection assistance server according to the embodiment.

The functional configuration as shown in FIG. 3 is implemented in the task selection assistance server 100 by the hardware and software provided in the task selection assistance server 100 as described above. Functions of each component will be described below.

A user location information obtaining portion 208 obtains user location information indicating a user location. In the embodiment, the user location information obtaining portion 208 obtains the user location information from a location sensor such as a global positioning system (GPS) or the like provided on the portable terminal 101 belonging to the user.

A domain candidate determining portion (attribute candidate determining means) 210 determines domain candidates to be presented to the user from among domains stored in the task model DB 102. At this time, the domain candidate determining portion 210 determines domains to be preferentially presented to the user based on the user location information if the user location information obtaining portion 208 can obtain the user location information. The domain candidate determining portion 210 then rearranges domains so that domains to be preferentially presented to the user are located at higher level and/or excludes domains with lower priority from domains to be presented to the user to generate the domain candidates to be presented to the user.

A domain retrieving portion 206 retrieves domains from the task model DB 102 under instructions of the domain candidate determining portion 210.

A domain candidate transmitting portion 201 transmits domain candidates determined by the domain candidate determining portion 210 to the portable terminal 101 belonging to the user in order to present them to the user.

A user selected domain obtaining portion (user selected attribute obtaining means) 203 obtains a domain selected by the user from the domain candidates which have been determined by the domain candidate determining portion 210 and transmitted to the portable terminal 101 by the domain candidate transmitting portion 201.

A task phase determining portion 207 determines a phase of the task desired by the user (i.e. whether the task is in an executing phase or in a planning phase) based on both the user location information obtained by the user location information obtaining portion 208 and the domains obtained by the user selected domain obtaining portion 203. In the embodiment, the task phase determining portion 207 determines that the user desires a task in the executing phase if the user location corresponds to the domain selected by the user, and otherwise, determines that the user desires a task in the planning phase.

A user query obtaining portion 204 obtains a query inputted by the user operating the portable terminal 101 to search for a desired task.

A sensor information obtaining portion 209 obtains sensor information measured by sensors which measure environmental conditions around the user.

A task candidate determining portion 211 determines task candidates to be presented to the user from among tasks stored in the task model DB 102 based on the domains obtained by the user selected domain obtaining portion 203. At this time, the task candidate determining portion 211 determines tasks to be preferentially presented to the user based on at least one of the user location information obtained by the user location information obtaining portion 208, the task phase determined by the task phase determining portion 207, the query obtained by the user query obtaining portion 204, and the sensor information obtained by the sensor information obtaining portion 209, to rearrange the tasks and/or narrow down the task candidates.

A task retrieving portion 205 retrieves tasks from the task model DB 102 under instructions of the task candidate determining portion 211.

A task candidate transmitting portion 200 transmits task candidates determined by the task candidate determining portion 211 to the portable terminal 101 in order to present them to the user.

A user selected task obtaining portion 202 obtains a task selected by the user operating the portable terminal 101 from the task candidates transmitted by the task candidate transmitting portion 200.

[1.2. Configuration of Portable Terminal]

The configuration of the portable terminal 101 will now be described. The portable terminal 101 has wireless data communication functions. Terminals corresponding to the portable terminal 101 include a cellular phone, a personal handy-phone system (PHS), a personal digital assistance (PDA), and the like.

Figure 4:
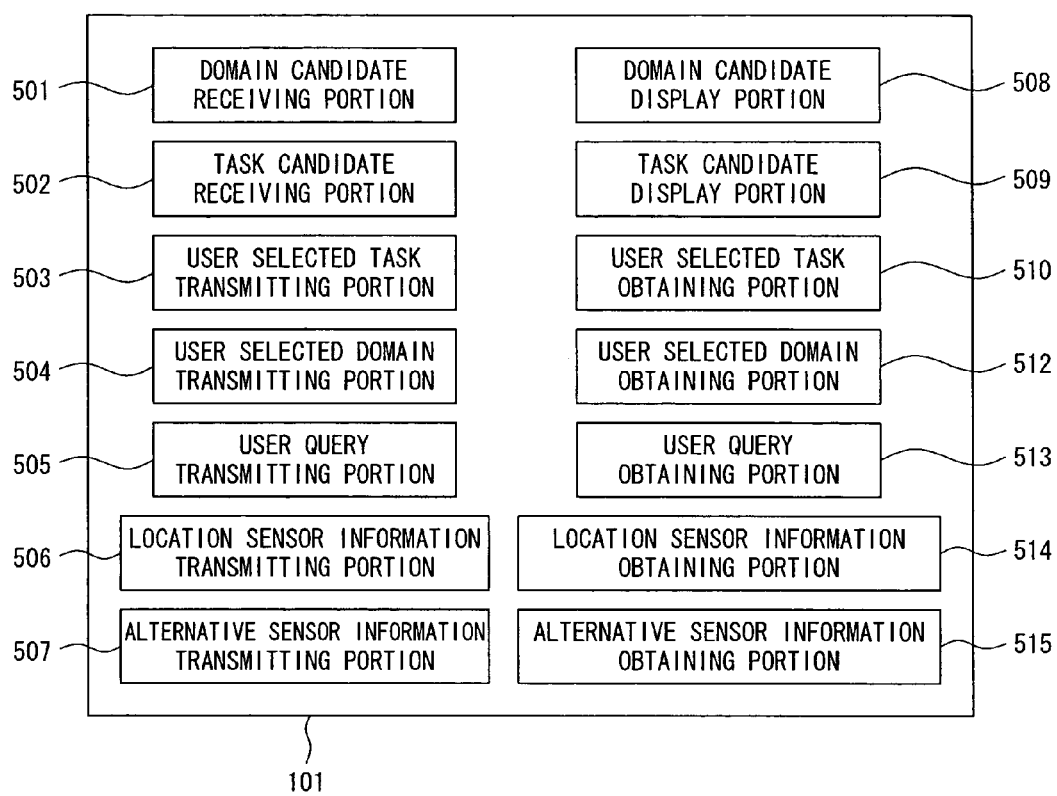
FIG. 4 is a block diagram of a portable terminal according to the embodiment.

The portable terminal 101 is provided with a CPU, a memory, a wireless communication interface, various sensors including a GPS receiver and weather sensor, a display, operation keys, and various types of software stored in the memory. The functional configuration as shown in FIG. 4 is implemented by the above hardware and software provided in the portable terminal 101. Functions of each component will be described below.

A location sensor information obtaining portion 514 obtains user location information from a location sensor such as a GPS provided on the portable terminal 101. Other than the GPS provided on the portable terminal 101, for example, location information from a base station of the area where the portable terminal 101 resides, user inputted information from the portable terminal 101, another GPS receiver which the user separately carries, and the like may be used as means for obtaining the user location information.

A location sensor information transmitting portion 506 transmits the user location information obtained by the location sensor information obtaining portion 514 to the task selection assistance server 100.

An alternative sensor information obtaining portion 515 obtains sensor information from environmental measurement sensors (such as weather sensor, other than the location sensor) provided on the portable terminal 101. An alternative sensor information transmitting portion 507 transmits the sensor information obtained by the alternative sensor information obtaining portion 515 to the task selection assistance server 100.

A domain candidate receiving portion 501 receives domain candidates from the task selection assistance server 100. A domain candidate display portion 508 displays a list of domain candidates received by the domain candidate receiving portion 501 on a display of the portable terminal 101.

When the user operates the operation keys on the portable terminal 101 to select a desired domain from the domain candidates displayed on the display, a user selected domain obtaining portion 512 obtains the selected domain. A user selected domain transmitting portion 504 transmits the domain obtained by the user selected domain obtaining portion 512 to the task selection assistance server 100.

A task candidate receiving portion 502 receives task candidates from the task selection assistance server 100. A task candidate display portion 509 displays a list of task candidates received by the task candidate receiving portion 502 on the display of the portable terminal 101.

When the user operates the operation keys on the portable terminal 101 to select a desired task from the task candidates displayed on the display, a user selected task obtaining portion 510 obtains the selected task. A user selected task transmitting portion 503 transmits the task selected by the user to the task selection assistance server 100.

A user query obtaining portion 513 obtains a query inputted to the portable terminal 101 by the user. A user query transmitting portion 505 transmits the query obtained by the user query obtaining portion 513 to the task selection assistance server 100.

[2. Operation]

Processes of determining domain candidates and determining task candidates handled by the task selection assistance server 100 in the above configuration will now be described.

[2.1. Process of Determining Domain Candidates]

Figure 5:
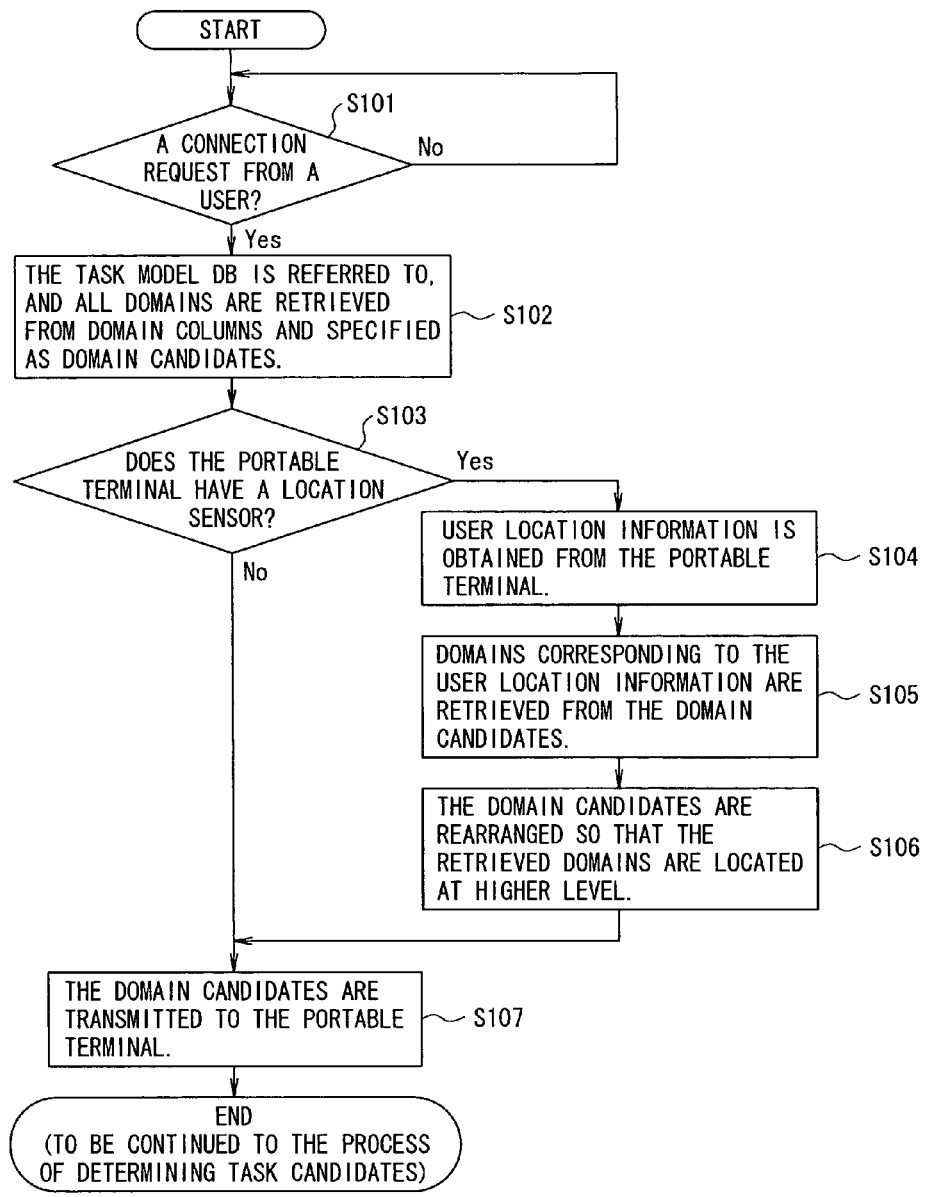
FIG. 5 is a flow chart of an example process of determining domain candidates according to the embodiment.

The process of determining domain candidates handled by the task selection assistance server 100 will first be described with reference to a flow chart shown in FIG. 5. In the process of determining domain candidates, the task selection assistance server 100 determines domain candidates to be displayed on the portable terminal 101, upon a connection request by the user from the portable terminal 101 to the task selection assistance server 100.

The task selection assistance server 100 first receives the connection request from the portable terminal 101 belonging to the user (step S101).

The domain retrieving portion 206 refers to the task model DB 102 and retrieves domains stored in domain columns. The domain candidate determining portion 210 specifies the domains retrieved by the domain retrieving portion 206 as domain candidates (step S102).

Then, the task selection assistance server 100 determines whether or not the portable terminal 101 has a location sensor such as a GPS (step S103). If the user location information obtaining portion 208 does not receive user location information from the portable terminal 101 and it is determined that the portable terminal 101 does not have a location sensor (No at step S103), the domain candidate determining portion 210 cannot narrow down domain candidates using a current user location, and therefore specifies the domain candidates, which have been specified at step S102, as final domain candidates to be presented to the user. The domain candidate transmitting portion 201 transmits the domain candidates specified by the domain candidate determining portion 210 to the portable terminal 101 in order to present them to the user (step S107).

On the other hand, if the portable terminal 101 has a location sensor, and user location can be obtained by the location sensor information obtaining portion 514 in the portable terminal 101 (Yes in step S103), the user location information obtaining portion 208 in the task selection assistance server 100 receives the user location from the portable terminal 101 (step S104).

The domain candidate determining portion 210 instructs the domain retrieving portion 206 to retrieve domains corresponding to the user location information, which has been received at step S104, from the domain candidates obtained at step S102 (step S105). At this point, the domains may "correspond to" the user location information, for example, when the lexical concept of a location indicated by the user location information resides in the lexical concept of the domain, when the user location indicated by the user location information matches the domain, and when a distance between a location indicated by the user location information and a location indicated by the domain are within a predetermined range.

The domain candidate determining portion 210 specifies the retrieved domains as domains to be preferentially presented to the user, and rearranges domain candidates so that the specified domains are located at higher level in the domain candidates extracted at step S102 (step S106). The domain candidate transmitting portion 201 transmits the domain candidates rearranged by the domain candidate determining portion 210 to the portable terminal 101 (step S107). The process of determining domain candidates is thus completed.

A specific example of operation for the process of determining domain candidates as described above will now be described. It is assumed here that the task model DB 102 stores data as shown in FIG. 2, and the domain retrieving portion 206 has obtained all domains "movie theater," "theme park," and "in town" from the task model DB 102 at step S102. The domain candidate determining portion 210 specifies these obtained domains "movie theater," "theme park," and "in town," as domain candidates.

In addition, the portable terminal 101 has a location sensor, and the user location information obtaining portion 208 has received a user location information "movie theater" at step S104.

The domain candidate determining portion 210 instructs the domain retrieving portion 206 to cause the task model DB 102 to be referenced to, and causes a domain corresponding to the received user location information "movie theater" to be retrieved from the domain candidates "movie theater," "theme park," and "in town" obtained in the step S102 (step S105). At this time, the domain corresponding to the user location information "movie theater" may be a "movie theater." When a user is in a "movie theater," the user is likely to choose a task which may be accomplished in the "movie theater." Therefore, the domain candidate determining portion 210 at this time rearranges the domain candidates "movie theater," "theme park," and "in town," in this order (step S106). The domain candidate transmitting portion 201 transmits the domain candidates rearranged by the domain candidate determining portion 210 to the portable terminal 101 (step S107).

The domain candidate receiving portion 501 in the portable terminal 101 receives the domain candidates, and the domain candidate display portion 508 displays the domain candidates.

Alternatively, to preferentially present domains to the user, items with lower priority may be omitted in the display through a predefined maximum number of displayed items, in addition to rearranging domains in descending order of priority as described above.

[2.2. Process of Determining Task Candidates]

Figure 6:
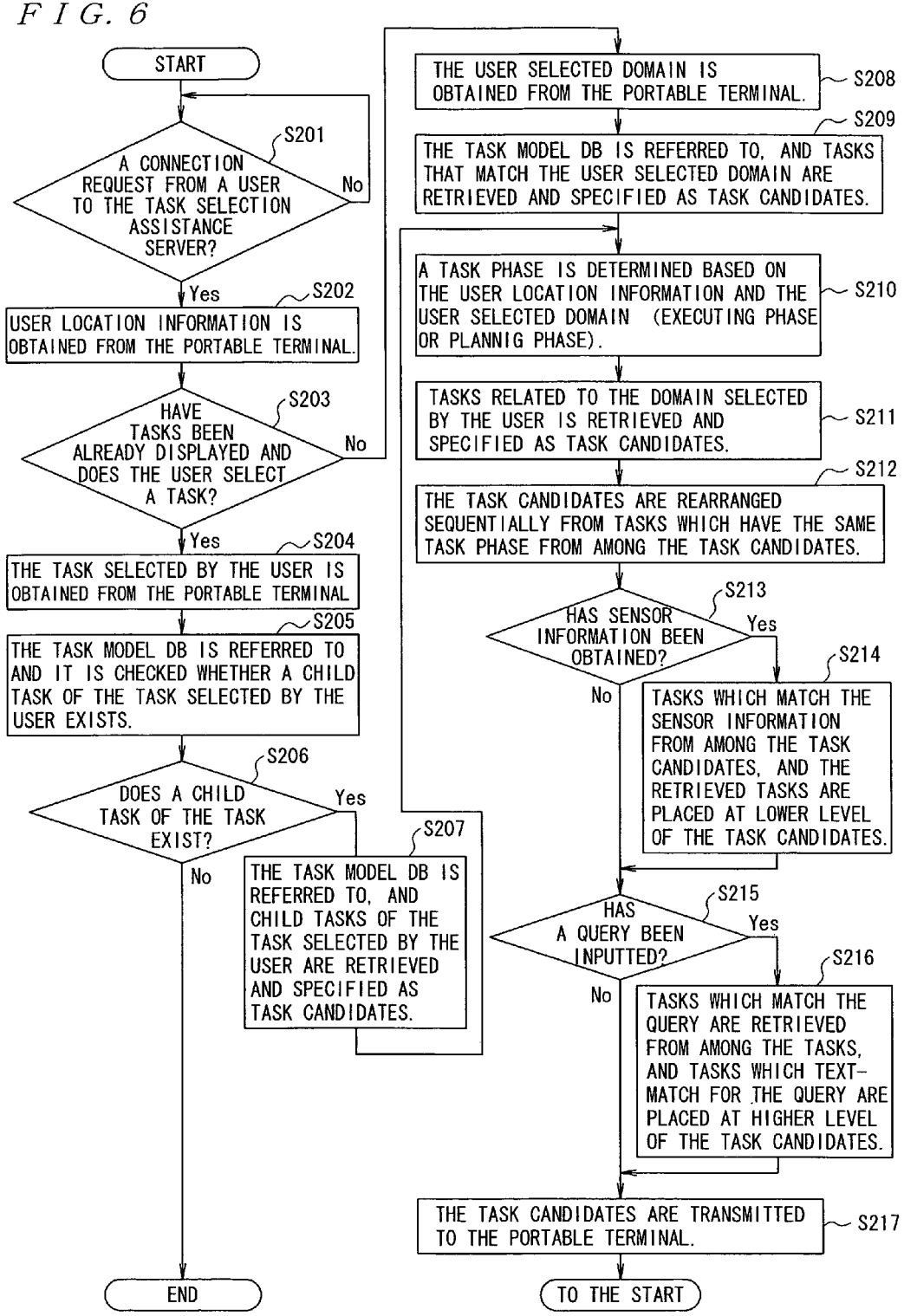
FIG. 6 is a flowchart of an example process of determining task candidates according to the embodiment.

Then, the process of determining task candidates handled by the task selection assistance server 100 will be described with reference to FIG. 6. In the process of determining task candidates, the user selects a desired task from the domain candidates, and then task candidates are determined based on the selected domain.

The user first operates the portable terminal 101 to select a desired domain from the domain candidates displayed on the display. In this way, the user selected domain obtaining portion 512 in the portable terminal 101 obtains the domain selected by the user, and the user selected domain transmitting portion 504 transmits the domain obtained by the user selected domain obtaining portion 512 to the task selection assistance server 100 (Yes at step S201).

The user selected domain obtaining portion 203 in the task selection assistance server 100 receives the domains transmitted from the portable terminal 101 (No at step S203, step S208).

It is assumed here that, the user selected domain "movie theater" is received at step S208. It is also assumed that the portable terminal 101 has a location sensor, and the user location information "movie theater" has been obtained from the portable terminal 101 at step S202.

The task retrieving portion 205 refers to the task model DB 102, and retrieves tasks which are associated with domains corresponding to the domain "movie theater" selected by the user and are stored in the task model DB 102. The task candidate determining portion 211 specifies the retrieved tasks as task candidates (step S209).

At step S210, the task phase determining portion 207 determines that the user desires a task in the executing phase based on the user selected domain "movie theater" and the obtained user location information "movie theater," because the user desires a task related to a "movie theater" while in a "movie theater," and therefore it is considered that the user is likely to desire a task which can be accomplished in the "movie theater."

On the other hand, if the user selected domain obtaining portion 203 receives a user selected domain "theme park" at step S208, the task phase determining portion 207 determines that the user desires a task in the planning phase based on the domain "theme park" and the user location information "movie theater," because the user desires a task related to a "theme park" while in a "movie theater." Therefore, it is considered that the user is not likely to desire a task which can be accomplished in the "movie theater," and is likely to implement a certain plan in relation to the "theme park."

If the domain "movie theater" is obtained at step S208, at step S211, the task candidate determining portion 211 instructs the task retrieving portion 205 to first cause a topmost task in terms of the domain "movie theater" to be retrieved from the task candidates obtained at step S209. In this case, a task "Go to a movie" is applicable.

Then, the task candidate determining portion 211 instructs the task retrieving portion 205 to cause the task model DB 102 shown in FIG. 2 to be referenced to, and causes tasks which have a parent task "Go to a movie" and are in the executing phase to be retrieved, in terms of the domain "movie theater." In this case, tasks "Have a meal during a waiting time" and "Buy a booklet" are applicable.

Figure 7:
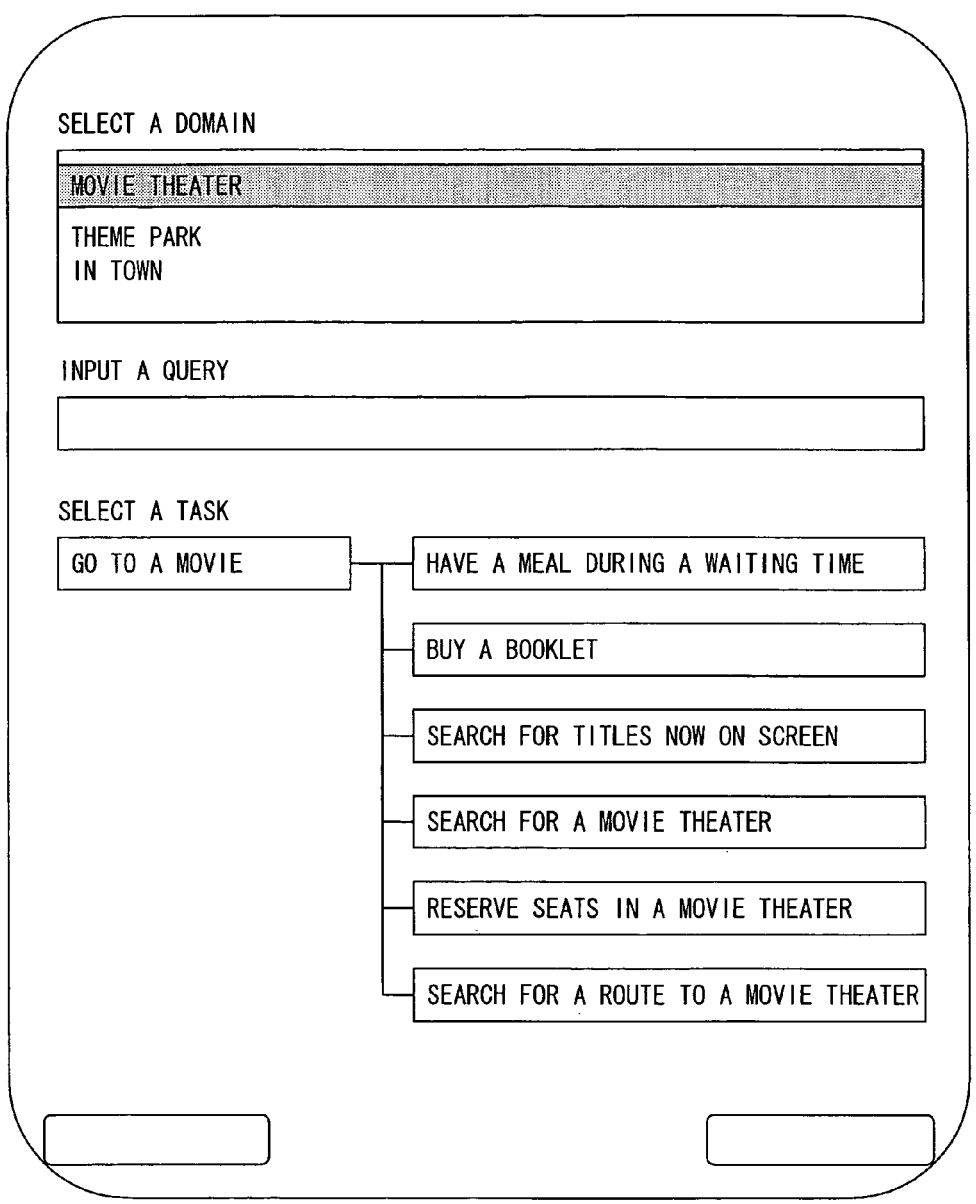
FIG. 7 shows an example of a display screen on a portable terminal according to the embodiment.

Then, task candidate determining portion 211 also causes tasks which are applicable to both the executing and planning phases to be retrieved. In this case, "Search for titles now on screen" is retrieved. However, the user might possibly desire a task which is in the planning phase instead of the executing phase at this point. Therefore, it is assumed here that the task candidates are rearranged according to the determination at step S210 in descending order of possibility that the task may be selected (step S212). In this case, the task candidates are rearranged into the order "Have a meal during a waiting time," "Buy a booklet," "Search for titles now on screen," "Search for a movie theater," "Reserve seats in a movie theater," and "Search for a route to a movie theater" from the top. At step S217, the task candidates are transmitted to the portable terminal 101, and the display of the portable terminal 101 displays a screen as shown in FIG. 7.

In this way, rearranging the task candidates enables tasks in the executing phase, which may be accomplished in the "movie theater," to be located at higher level. This may help a user to select a task.

On the other hand, if the domain "theme park" is selected at step S208, the task candidate determining portion 211 similarly at step S211 instructs the task retrieving portion 205 to first retrieve a topmost task in terms of the domain "theme park" from the task candidates obtained at step S209. In this case, a task "Enjoy in a theme park" is applicable. Then, the task candidate determining portion 211 causes tasks which have a parent task "Enjoy in a theme park" and are in the planning phase to be retrieved, in terms of the domain "theme park." In this case, a task "Search for a route to a theme park" is retrieved. Then, tasks which are applicable to both the executing and planning phases are retrieved. In this case, a task "Watch a parade" is retrieved. However, the user might possibly desire a task which is in the executing phase instead of the planning phase at this point. Therefore, it is assumed here that the task candidates are rearranged according to the determination at step S210 in descending order of possibility that the task may be selected (step S212). In this case, the task candidates are rearranged into the order "Search for a route to a theme park," "Watch a parade," and "Have a meal during a waiting time" from the top. In this way, rearranging the task candidates enables tasks in the planning phase, which may be accomplished in the "theme park," to be located at higher level. This may help a user to select a task.

If the portable terminal 101 does not have a location sensor, the task retrieving portion 205 refers to the task model DB 102 and selects all tasks having a domain selected by the user at step S209. Because the task phase cannot be determined, the task candidates are not rearranged based on the task phase as described above.

The task candidate transmitting portion 200 transmits the task candidates rearranged by the task candidate determining portion 211 to the portable terminal 101 to present to the user (step S217).

The task candidate receiving portion 502 in the portable terminal 101 receives the task candidates, and the task candidate display portion 509 displays the task candidates on the display of the portable terminal 101.

To present task candidates to the user, items with lower priority may be omitted in the display through a predefined maximum number of displayed items, in addition to rearranging tasks in descending order of priority as described above.

Description will now be made of further narrowing down tasks after the user selects a task. For example, consider that the user selects the task "Have a meal during a waiting time" from the task candidates displayed on the display, after the user has selected the domain "movie theater." The user selected task obtaining portion 510 in the portable terminal 101 obtains the task selected by the user, the user selected task transmitting portion 503 transmits the task obtained by the user selected task obtaining portion 510 to the task selection assistance server 100.

The user selected task obtaining portion 202 in the task selection assistance server 100 receives the selected task from the portable terminal 101 (Yes at step S203, step S204).

Then, the task candidate determining portion 211 instructs the task retrieving portion 205 to refer to the task model DB 102 and retrieve a child task of the task "Have a meal during a waiting time" whose domain matches the "movie theater" (step S205→Yes at step S206→step S207). In this case, the task candidates are "Have a snack in a coffee shop," "Have a meal in a fast food restaurant," and "Buy a snack in a movie theater."

Figure 8:
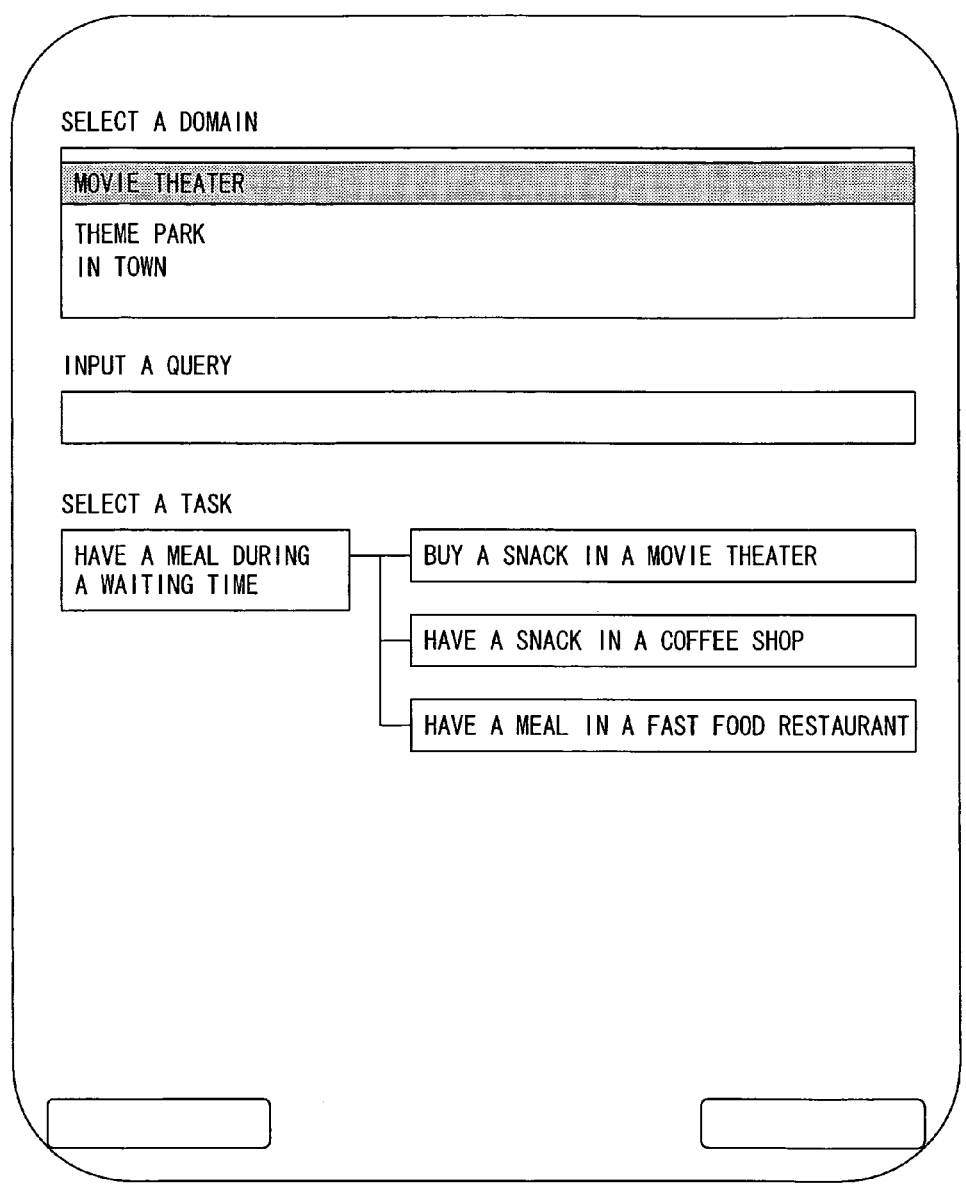
FIG. 8 shows an example of another display screen on a portable terminal according to the embodiment.

The process of rearranging the task candidates is similar to that as described above. Specifically, whether a task desired by the user is in the executing phase or the planning phase may be determined based on both a domain selected by the user and user location information obtained from a location sensor, and therefore, tasks are rearranged in the order of tasks matching the phase desired by the user (steps S210 to S212). In this example, the domain is a "movie theater" and the user location information is also "movie theater." This, therefore, suggests that the user needs a task in the executing phase, and task candidates are rearranged into the order "Buy a snack in a movie theater," "Have a snack in a coffee shop," and "Have a meal in a fast food restaurant." These task candidates are transmitted from the task candidate transmitting portion 200 to the portable terminal. They are received at the task candidate receiving portion 502 in the portable terminal, and the task candidate display portion 509 displays them on the display of the portable terminal 101. FIG. 8 shows an example of a screen displayed on the display of the portable terminal 101.

If the portable terminal 101 has an environmental measurement sensor such as a weather sensor (Yes at step S213), the alternative sensor information obtaining portion 515 in the portable terminal 101 obtains sensor information from the environmental measurement sensor and the alternative sensor information transmitting portion 507 transmits the sensor information to the task selection assistance server 100.

The sensor information obtaining portion 209 in the task selection assistance server 100 receives the sensor information from the portable terminal 101 (Yes at step S213) Then, the task candidate determining portion 211 instructs the task retrieving portion 205 to refer to the "weather sensor" column in the task model DB 102 and retrieve tasks which match the received sensor information from task candidates. The task candidate determining portion 211 rearranges the task candidates so that the retrieved tasks are located at lower level (step S214). For example, if the domain "theme park" is selected and the sensor information "It is raining" for the weather sensor is received, the task candidates are rearranged into the order "Search for a route to a theme park," "Have a meal during a waiting time," and "Watch a parade" from the top, and transmitted to the portable terminal 101.

If the portable terminal 101 has a query input function, the user query obtaining portion 513 in the portable terminal 101 obtains a user query, and the user query transmitting portion 505 in the portable terminal 101 transmits the query to the task selection assistance server 100.

The user query obtaining portion 204 in the task selection assistance server 100 receives the query from the portable terminal 101 (Yes at step S215). Then, the task candidate determining portion 211 instructs the task retrieving portion 205 to refer to the task model DB 102 and retrieves tasks, which text-match for the received query, from the task candidates. The task candidate determining portion 211 rearranges the task candidates so that the tasks which at least partially text-match for the query are located at higher level in the task candidates (step S216). For example, if a query "parade" is inputted in the above example, displayed items are rearranged into the order "Watch a parade," "Search for a route to a theme park," and "Have a meal during a waiting time" from the top. The task candidate transmitting portion 200 transmits the task candidates to the portable terminal 101 (step S217).

In this way, presenting task candidates which have been narrowed down with a location subject to a task and/or which have been prioritized relative to each other to the user allows the user to easily specify a desired task. This may help a user to select a task.

As described above, the task selection assistance server 100 first determines domain candidates to be presented to a user, and then narrows down task candidates based on a domain selected by the user from the determined domain candidates. Therefore, even when the user uses the portable terminal 101, which is poor in operability, to select a task, the user may easily find his or her desired task for solving a problem, and burdens on the user may be alleviated in selecting a task.

In addition, the user is allowed to narrow down domain candidates and/or task candidates based on the user location obtained from the location sensor, and therefore, optimal tasks may be presented to the user depending on user location.

Further, tasks which are appropriate for the user task phase may be presented based on user location information obtained from the portable terminal 101 and domains selected by the user, and therefore, burdens on the user may be alleviated in selecting a task.

Still further, because task candidates may be narrowed down using a query specified by the user, burdens on the user may be alleviated in selecting a task.

In addition, sensor information obtained from the various environmental measurement sensors such as a weather sensor provided on the portable terminal 101 may be used to narrow down task candidates which are appropriate for environmental conditions around the user, and therefore, burdens on the user may be alleviated in selecting a task.

[3. Variations]

Although embodiments according to the invention have been described above, the present invention is not intended to be limited to such embodiments, and many variations may be possible within the scope of technical ideas thereof. For example, the following variations may be conceivable:

(1) In the above embodiments, although the task selection assistance system has been described as being composed of the task selection assistance server 100 and the portable terminal 101, the configuration of the task selection assistance system is not limited to this. For example, the task selection assistance system may be composed only of the task selection assistance server 100. In this case, the user could use a keyboard and/or a display provided on the task selection assistance server 100 to select a task instead of using the portable terminal 101. The user may carry equipment such as a GPS receiver and a gyro, and transmit user location information from the equipment to the task selection assistance server 100.

Alternatively, the portable terminal 101 may have all the function of the task selection assistance server 100 according to the embodiments as described above. In this case, the portable terminal 101 would correspond to a "task selection assistance apparatus" in claims.

Alternatively, in the above embodiments, although the hard disk device provided on the task selection assistance server 100 has been described as storing the task model DB 102, the task selection assistance server 100 and the task model DB 102 may be separate devices. In this case, both the task selection assistance server 100 and the task model DB 102 would correspond to a "task selection assistance apparatus" in claims.

(2) In the above embodiments, although the "attribute information" has been described as being a domain indicating a location subject to a task, the "attribute information" is not limited to this, and may be any information with which the task candidates may be narrowed down. Possible attribute information includes, for example, a period of time and a season, in addition to the task phases and weather as described above.

When a user uses the portable terminal 101 to select a task, burdens in selecting a task may be more effectively alleviated if the "attribute information" is a domain. This is because the task selection assistance server 100 can appropriately determine domain candidates and/or task candidates to be preferentially presented to the user based on user location information received from the portable terminal 101, which indicates the user location, and transmit the determined domain candidates and/or task candidates to the portable terminal 101. Therefore, even when the user uses the portable terminal 101, which has a small screen and is poor in operability, the user may easily find his or her desired task.

(3) In the above embodiments, although description has been made of the task phase including an executing phase and a planning phase, the task phase is not limited to these, and tasks in various phases may be defined. For example, a task "Relax in a bar next to a movie theater," which is in an ending phase and corresponds to the domain "movie theater," may be defined.

The present invention may be utilized in any fields where it is advantageous to alleviate burdens on a user in selecting a task by means of task attributes such as a domain and help the user to efficiently select a task.

What is claimed is:

1. A task selection assistance apparatus for assisting a user to select a task, the task selection assistance apparatus comprising a task selection assistance server communicable with a portable terminal, the task selection assistance server including:

task model storing means for storing one or more tasks each indicating an action to be taken by the user to solve the user's problem in association with one or more pieces of attribute information each indicating an attribute of a task;

attribute candidate determining means for determining one or more attribute information candidates to be presented to the user from the one or more pieces of attribute information stored in the task model storing means;

user selected attribute obtaining means for obtaining the one or more pieces of attribute information selected by the user from the one or more attribute information candidates determined by the attribute candidate determining means; and task candidate determining means for determining one or more task candidates to be presented to the user from the one or more tasks stored in the task model storing means, based on the one or more pieces of attribute information obtained by the user selected attribute obtaining means, wherein the one or more task candidates can be narrowed down with the one or more pieces of attribute information including: a domain that is subject location information indicating a location subject to a task; and a task phase, and wherein the task phase includes an executing phase and a planning phase, the task in the executing phase is expected to be accomplished in the domain, the task in the planning phase is expected to be accomplished in other locations than the domain, and the task which is expected to be accomplished in a location independent of the domain is applicable to both of the executing and planning phases.

2. The task selection assistance apparatus according to claim 1, further comprising user location information obtaining means for obtaining from the portable terminal the user location information indicating the user's location, wherein the attribute candidate determining means determines one or more pieces of the subject location information to be preferentially presented to the user based on the user location information obtained by the user location information obtaining means.

3. The task selection assistance apparatus according to claim 1, further comprising task phase determining means for determining the task phase desired by the user, by comparing the user location information obtained by the user location information obtaining means to the one or more pieces of the subject location information, which is the domain included in the attribute information and which is obtained by the user selected attribute obtaining means, wherein the task candidate determining means determines the one or more task candidates to be preferentially presented to the user, based on the task phase determined by the task phase determining means, and wherein the task phase determining means determines that the user desires the task in the executing phase when the user location information corresponds to the domain that is the subject location information selected by the user, and determines that the user desires the task in the planning phase when the user location information does not correspond to the domain that is the subject location information selected by the user.

4. The task selection assistance apparatus according to claim 1, further comprising query obtaining means for obtaining a query inputted by the user to search for a desired task, wherein the task candidate determining means determines the one or more task candidates to be preferentially presented to the user, based on the query obtained by the query obtaining means.

5. The task selection assistance apparatus according to claim 1, wherein the attribute information further includes an environmental condition around the user, and further comprising sensor information obtaining means for obtaining one or more pieces of sensor information measured by one or more sensors which measure the environmental condition around the user, wherein the task candidate determining means determines the one or more task candidates to be preferentially presented to the user, based on the one or more pieces of sensor information obtained by the sensor information obtaining means and the one or more pieces of attribute information obtained by the user selected attribute obtaining means.

6. The task selection assistance apparatus according to claim 1, wherein the task model storing means has data items including: a task ID; a parent task ID; the task; the domain; the task phase; and weather sensor.

7. The task selection assistance apparatus according to claim 1, further comprising:

a task candidate transmitting portion that transmits the one or more task candidates determined by the task candidate determining means to a portable terminal in order to present the one or more task candidates to the user; and a user selected task obtaining portion that obtains a task selected by the user operating the portable terminal from the one or more task candidates transmitted by the task candidate transmitting portion.

8. The task selection assistance apparatus according to claim 1, wherein the portable terminal includes a location sensor.

9. A task selection assistance method for assisting a user to select a task, the task selection assistance method comprising:

a subject location candidate obtaining step of obtaining one or more subject location information candidates to be presented to the user from a task model database storing one or more tasks each indicating an action to be taken by the user to solve the user's problem in association with one or more pieces of subject location information each indicating a location subject to a task;

a user location from a portable terminal of the user information obtaining step of obtaining user location information indicating the user's location;

a rearranging step of rearranging the one or more subject location information candidates obtained in the subject location candidate obtaining step so that one or more pieces of subject location information corresponding to the user location information obtained in the user location information obtaining step is located at higher level; and a subject location presenting step of presenting the one or more subject location information candidates rearranged in the rearranging step to the user, and a task candidate determining step of determining one or more task candidates to be presented to the user from the task model database, wherein the one or more task candidates can be narrowed down with the one or more pieces of attribute information including: a domain that is subject location information indicating a location subject to a task: and a task phase, and wherein the task phase includes an executing phase and a planning phase, the task in the executing phase is expected to be accomplished in the domain, the task in the planning phase is expected to be accomplished in other locations than the domain, and the task which is expected to be accomplished in a location independent of the domain is applicable to both of the executing and planning phases.

10. The task selection assistance method according to claim 9, further comprising:

a user selected subject location information obtaining step of obtaining one or more pieces of subject location information selected by the user from the one or more subject location information candidates presented to the user in the subject location presenting step; and the task candidate determining step of determining one or more task candidates to be presented to the user from the task model database is based the one or more pieces of subject location information obtained in the user selected subject location information obtaining step.

11. The task selection assistance method according to claim 9, wherein the portable terminal includes a location sensor.

\* \* \* \* \*